United States Patent
Komori

(10) Patent No.: US 12,330,573 B2
(45) Date of Patent: Jun. 17, 2025

(54) DRIVING ASSISTANCE DEVICE, DRIVING ASSISTANCE METHOD, VEHICLE, AND STORAGE MEDIUM

(71) Applicant: HONDA MOTOR CO., LTD., Tokyo (JP)

(72) Inventor: Kenji Komori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 223 days.

(21) Appl. No.: 18/114,019

(22) Filed: Feb. 24, 2023

(65) Prior Publication Data

US 2024/0017694 A1    Jan. 18, 2024

(30) Foreign Application Priority Data

Mar. 18, 2022  (JP) .................. 2022-044214

(51) Int. Cl.
*B60R 21/01*    (2006.01)
(52) U.S. Cl.
CPC .... *B60R 21/01* (2013.01); *B60R 2021/01272* (2013.01); *B60R 2021/01286* (2013.01)
(58) Field of Classification Search
CPC ........... B60R 2021/01265; B60R 2021/01272; B60W 30/08–0956
See application file for complete search history.

(56) References Cited

U.S. PATENT DOCUMENTS

| | | | |
|---|---|---|---|
| 8,146,703 B2 * | 4/2012 | Baumann | B60T 7/22 180/275 |
| 9,266,536 B2 * | 2/2016 | Loria | B60W 50/0098 |
| 9,953,537 B2 * | 4/2018 | Sim | G06V 20/56 |

FOREIGN PATENT DOCUMENTS

JP    2013-254296 A    12/2013

* cited by examiner

*Primary Examiner* — Mark L. Greene
(74) *Attorney, Agent, or Firm* — THOMAS | HORSTEMEYER, LLP

(57) ABSTRACT

A driving assistance device for assisting driving by a driver of a vehicle is provided. The driving assistance device includes a recognition unit configured to recognize an environment around the vehicle, a travel wheel detection unit configured to detect a travel wheel included in the environment around the vehicle, an operation determination unit configured to determine whether the travel wheel satisfies an operation condition of a safety device of the vehicle, and an operation unit configured to operate the safety device in a case where it is determined that the travel wheel satisfies the operation condition.

10 Claims, 7 Drawing Sheets

DRIVING ASSISTANCE DEVICE, DRIVING ASSISTANCE METHOD, VEHICLE, AND STORAGE MEDIUM

CROSS-REFERENCE TO RELATED APPLICATION(S)

This application claims priority to and the benefit of Japanese Patent Application No. 2022-044214 filed on Mar. 18, 2022, the entire disclosure of which is incorporated herein by reference.

BACKGROUND OF THE INVENTION

Field of the Invention

The present invention relates to a driving assistance device, a driving assistance method, a vehicle, and a storage medium.

Description of the Related Art

Various techniques for assisting a driver of a vehicle have been proposed. Japanese Patent Laid-Open No. 2013-254296 proposes a technique for notifying a driver of a possibility of collision with another vehicle that has started to turn right or left in front of the vehicle.

When the front surface of a nearby vehicle faces the vehicle, the vehicle can accurately detect the nearby vehicle. However, when the side surface of the nearby vehicle faces the vehicle, the detection accuracy of the nearby vehicle may decrease.

SUMMARY OF THE INVENTION

Some aspects of the present invention provide a technique for accurately detecting the presence of another vehicle ahead.

According to an aspect, a driving assistance device for assisting driving by a driver of a vehicle is provided. The driving assistance device includes a recognition unit configured to recognize an environment around the vehicle, a travel wheel detection unit configured to detect a travel wheel included in the environment around the vehicle, an operation determination unit configured to determine whether the travel wheel satisfies an operation condition of a safety device of the vehicle, and an operation unit configured to operate the safety device in a case where it is determined that the travel wheel satisfies the operation condition.

Further features of the present invention will become apparent from the following description of exemplary embodiments with reference to the attached drawings.

DESCRIPTION OF THE EMBODIMENTS

Figure 1:
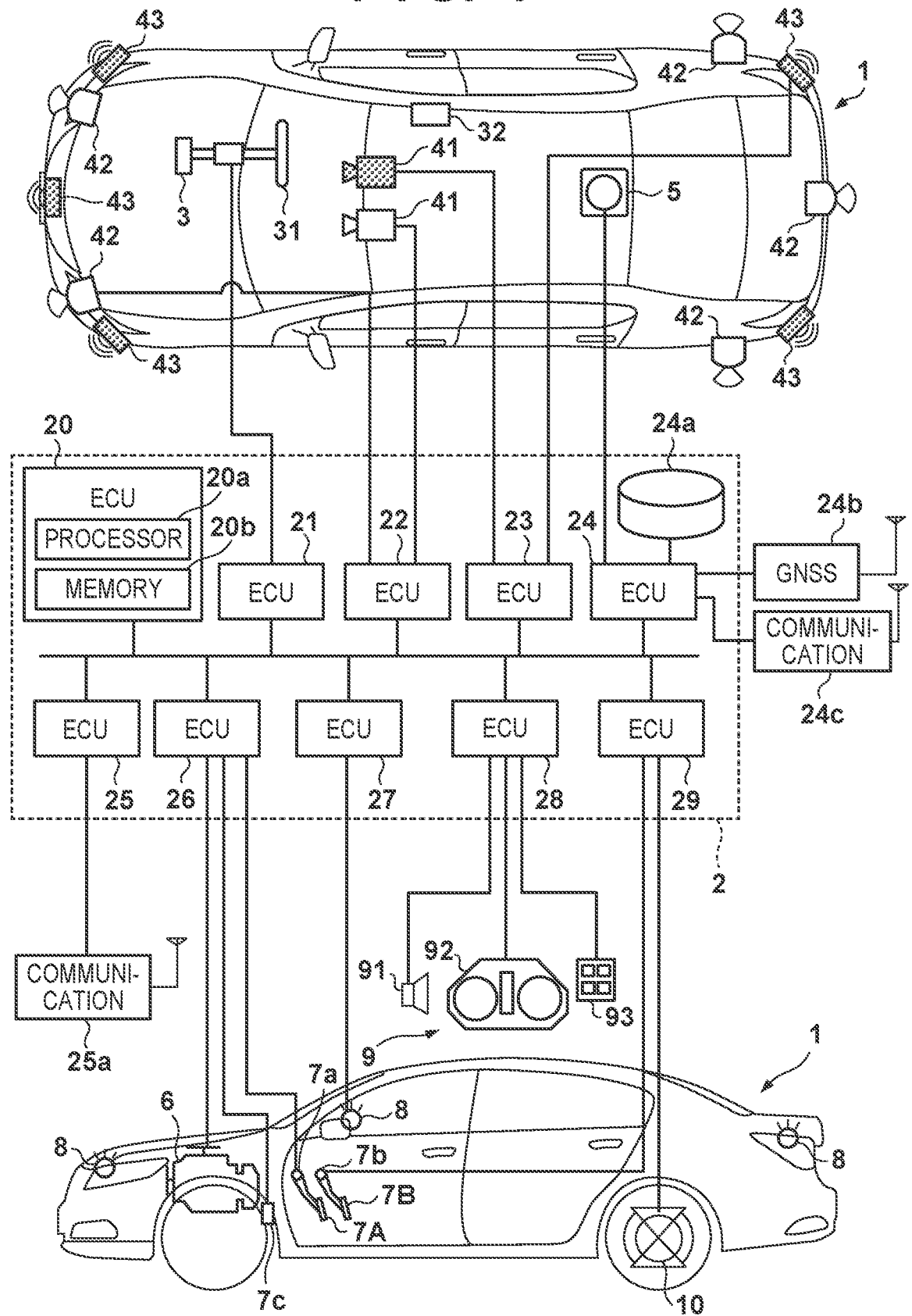
FIG. 1 is a diagram for describing a hardware configuration example of a vehicle according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a vehicle 1 according to an embodiment of the present invention. In FIG. 1, the vehicle 1 is schematically illustrated in a plan view and in a side view. The vehicle 1 is, for example, a sedan-type four-wheeled passenger vehicle. The vehicle 1 may be such a four-wheeled vehicle, a two-wheeled vehicle, or another type of vehicle.

The vehicle 1 includes a vehicle control device 2 (hereinafter, simply referred to as a control device 2) that controls the vehicle 1. The control device 2 includes a plurality of ECUs 20 to 29 communicably connected by an in-vehicle network. Each ECU includes a processor represented by a central processing unit (CPU), a memory such as a semiconductor memory, an interface with an external device, and the like. The memory stores programs executed by the processor, data used for processing by the processor, and the like. Each ECU may include a plurality of processors, memories, interfaces, and the like. For example, the ECU 20 includes a processor 20a and a memory 20b. The ECU 20 executes processing by the processor 20a executing a command included in a program stored in the memory 20b. Alternatively, the ECU 20 may include a dedicated integrated circuit such as an application-specific integrated circuit (ASIC) for the ECU 20 to execute processing. The same applies to other ECUs.

Hereinafter, functions and the like assigned to the ECUs 20 to 29 will be described. Note that the number of ECUs and functions to be assigned can be designed as appropriate, and can be subdivided or integrated as compared with the present embodiment.

The ECU 20 executes a control related to automated traveling of the vehicle 1. In automated driving, at least one of steering and acceleration/deceleration of the vehicle 1 is automatically controlled. The automated traveling by the ECU 20 may include automated traveling that does not require a driver to perform a traveling operation (which may also be referred to as automated driving) and automated traveling for assisting the driver in performing a traveling operation (which may also be referred to as driving assistance).

The ECU 21 controls an electric power steering device 3. The electric power steering device 3 includes a mechanism that steers front wheels in accordance with a driving operation (steering operation) given to a steering wheel 31 by a driver. The electric power steering device 3 includes a motor that produces driving force for assisting the steering operation and automatically steering the front wheels, a sensor that detects a steering angle, and the like. In a case where the driving state of the vehicle 1 is the automated driving, the ECU 21 controls the electric power steering device 3 in an automated manner in response to an instruction from the ECU 20, and controls the traveling direction of the vehicle 1.

The ECUs 22 and 23 control detection units 41 to 43 that detect a surrounding situation of the vehicle, and performs information processing of the detection results. The detection units 41 (hereinafter, it may be referred to as cameras 41) are cameras that capture images of the front of the vehicle 1 and are attached to the vehicle interior side of a windshield at the front of a roof of the vehicle 1 in the present embodiment. By analyzing the images captured by the cameras 41, it is possible to extract a contour of an object or extract a division line (white line or the like) of a lane on a road.

The detection units 42 are light detection and ranging (LiDAR) (hereinafter, also referred to as LiDARs 42) that detect a target object in the surrounding of the vehicle 1 and measure the distance to a target object, for example. In the present embodiment, five LiDARs 42 are provided, one at each corner portion of the front portion of the vehicle 1, one at the center of the rear portion of the vehicle 1, and one at each side of the rear portion of the vehicle 1. The detection units 43 are millimeter-wave radars (hereinafter, also referred to as radars 43) that detect a target object in the surrounding of the vehicle 1 and measures the distance to the target object, for example. In the present embodiment, five radars 43 are provided, one at the center of the front portion of the vehicle 1, one at each corner portion of the front portion of the vehicle 1, and one at each corner portion of the rear portion of the vehicle 1.

The ECU 22 controls one camera 41 and each LiDAR 42, and performs information processing of detection results. The ECU 23 controls the other camera 41 and each radar 43, and performs information processing on detection results. Providing two sets of devices for detecting the surrounding situation of the vehicle improves the reliability of the detection result. Providing different types of detection units such as a camera, a LiDAR, and a radar enables analyzing the surrounding environment of the vehicle in multiple ways.

The ECU 24 controls the gyro sensor 5, a global navigation satellite system (GNSS) sensor 24b, and a communication device 24c, and performs information processing of detection results or communication results. The gyro sensor 5 detects a rotational movement of the vehicle 1. It is possible to determine the course of the vehicle 1, based on a detection result of the gyro sensor 5, the wheel speed, and the like. The GNSS sensor 24b detects a current location of the vehicle 1. The communication device 24c performs wireless communication with a server that provides map information and traffic information, and acquires these pieces of information. The ECU 24 can access a database 24a of map information constructed in a memory, and the ECU 24 performs searching for a route from the current position to a destination and the like. The ECU 24, the map database 24a, and the GNSS sensor 24b constitute a so-called navigation device.

The ECU 25 includes a communication device 25a for inter-vehicle communication. The communication device 25a performs wireless communication with another vehicle in the surroundings to exchange information between the vehicles.

The ECU 26 controls a power plant 6. The power plant 6 is a mechanism that outputs driving force for rotating driving wheels of the vehicle 1, and includes, for example, an engine and a transmission. For example, the ECU 26 controls an output of the engine in response to a driving operation (accelerator operation or acceleration operation) of the driver that has been detected by an operation detection sensor 7a provided on an accelerator pedal 7A, and switches the gear ratio of the transmission based on information such as a vehicle speed that has been detected by a vehicle speed sensor 7c and the like. In a case where the driving state of the vehicle 1 is the automated driving, the ECU 26 controls the power plant 6 in an automated manner in response to an instruction from the ECU 20, and controls the acceleration or deceleration of the vehicle 1.

The ECU 27 controls lighting devices (headlights, taillights, and the like) including direction indicators 8 (blinkers). In the example of FIG. 1, the direction indicator 8 is provided on front parts, door mirrors, and rear parts of the vehicle 1.

The ECU 28 controls an input and output device 9. The input and output device 9 outputs information to the driver, and receives information input from the driver. A sound output device 91 notifies the driver of information by a sound. A display device 92 notifies the driver of information by displaying an image. The display device 92 is arranged, for example, in front of a driver's seat and constitutes, for example, a console. Although the sound and the display have been given as examples here, information may be notified by vibration or light. In addition, information may be notified by a combination from among sound, display, vibration, and light. Furthermore, the combination or the form of notification may be changed in accordance with the level (for example, the degree of urgency) of information to be notified. An input device 93 is a group of switches disposed at positions where the driver is able to operate them, and is used for giving an instruction to the vehicle 1, but may also include a voice input device.

The ECU 29 controls a brake device 10 and a parking brake (not illustrated). The brake device 10 is, for example, a disc brake device, is provided on each wheel of the vehicle 1, and applies resistance against a rotation of the wheel to decelerate or stop the vehicle 1. The ECU 29 controls operations of the brake device 10 in response to a driving operation (braking operation) performed by the driver and detected by an operation detection sensor 7b provided on a brake pedal 7B, for example. In a case where a driving state of the vehicle 1 is the automated driving, the ECU 29 automatically controls the brake device 10 in response to an instruction from the ECU 20, and controls the deceleration and stopping of the vehicle 1. It is also possible to operate the brake device 10 and the parking brake to keep the vehicle 1 in a stopped state. In a case where the transmission of the power plant 6 includes a parking lock mechanism, it is also possible to operate the parking lock mechanism to keep the vehicle 1 in a stopped state.

Figure 2:
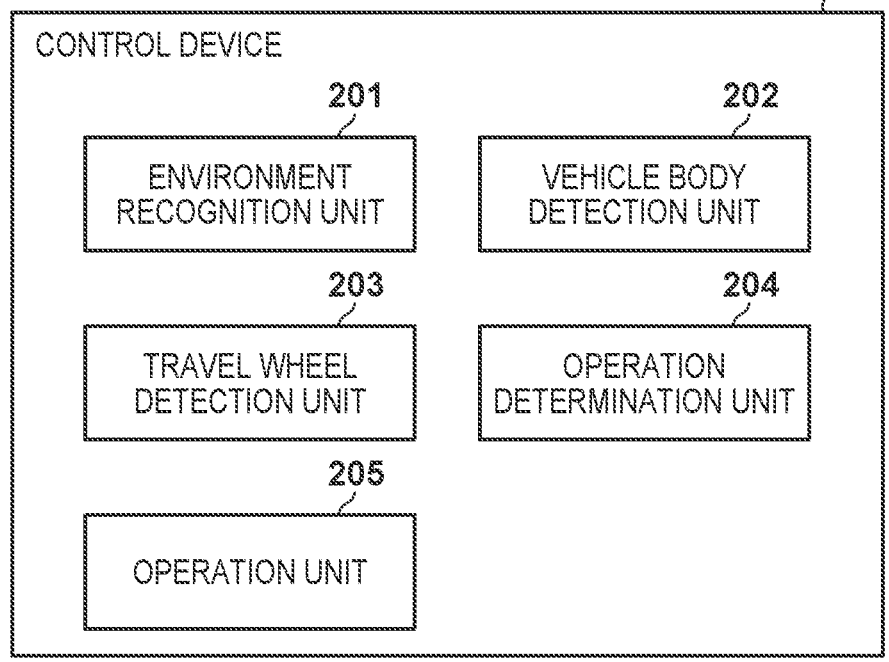
FIG. 2 is a diagram illustrating a functional configuration example of a control device of the vehicle according to the embodiment of the present invention.

A functional configuration example of the control device 2 will be described with reference to FIG. 2. In the embodiment described below, the control device 2 has a function for supporting driving by the driver of the vehicle 1. Therefore, the control device 2 may be referred to as a driving assistance device. FIG. 2 illustrates functions related to driving assistance among the functions of the control device 2. The control device 2 may have a function not illustrated in FIG. 2. The control device 2 includes an environment recognition unit 201, a vehicle body detection unit 202, a travel wheel detection unit 203, an operation determination unit 204, and an operation unit 205. These functional units may be realized by the processor 20*a* of one or more of the ECUs 20 to 29 included in the control device 2. Specifically, the operation of these functional units may be performed by the processor 20*a* executing a program read in the memory 20*b*. Alternatively, some or all of these functional units may be realized by a dedicated circuit such as an application-specific integrated circuit (ASIC) or a field programmable gate array (FPGA).

The environment recognition unit 201 recognizes the environment around the vehicle 1, for example, by analyzing detection results of detection units 41 to 43. For example, the environment recognition unit 201 may recognize a target object included in the environment around the vehicle 1 by analyzing images captured by the cameras 41. Since the recognition of the environment around the vehicle 1 may be performed by using an existing technology, a detailed description thereof will be omitted.

The vehicle body detection unit 202 detects the vehicle body included in the environment around the vehicle 1 based on the recognition result of the environment recognition unit 201. The environment around the vehicle 1 may include the environment in front of the vehicle 1 or the environment in the traveling direction of the vehicle 1. The vehicle body may be the entire outer shape of the vehicle. The vehicle body detected by the vehicle body detection unit 202 may be a vehicle body of a four-wheeled vehicle, a vehicle body of a two-wheeled vehicle, or a vehicle body of a different vehicle.

The travel wheel detection unit 203 detects travel wheels included in the environment around the vehicle 1 based on the recognition result of the environment recognition unit 201. The environment around the vehicle 1 may include the environment in front of the vehicle 1 or the environment in the traveling direction of the vehicle 1. The travel wheel may be a wheel (that is, a rotating wheel) of a traveling vehicle. The travel wheel detection unit 203 does not have to detect a wheel of a stopped vehicle as a travel wheel. The wheel detected by the travel wheel detection unit 203 may be a wheel of a four-wheeled vehicle, a wheel of a two-wheeled vehicle, or a wheel of a different vehicle. The wheel is a part of the vehicle body.

The operation determination unit 204 determines whether or not a safety device (hereinafter, simply referred to as a safety device) of the vehicle 1 operates. The determination criterion thereof will be described in detail later. The operation unit 205 operates the safety device when it is determined to operate the safety device. The safety device is a device for improving safety of an occupant (a driver and a passenger) of the vehicle 1, such as a seat belt (for example, a seat belt 32 of the driver's seat) of the vehicle 1, a brake device 10, and a warning indicator in a display device 92. The safety of the occupant of the vehicle 1 is improved by operating the safety device. For example, operating the safety device may include turning on the warning indicator of the display device 92 or outputting a warning sound from a sound output device 91. Alternatively or additionally, the operation of the safety device and the automatic operation of the brake device 10 of the vehicle 1 may be included. Alternatively or additionally, the operation of the safety device and the increase of the tensile force of the seat belt of the vehicle 1 may be included. For example, the operation unit 205 may increase the tensile force of the seat belt until it is determined that a safety condition is reached. Alternatively, the operation unit 205 may issue a warning to the driver by repeatedly intensifying the tensile force of the seat belt 32 in a pulsing manner (for example, for 0.1 seconds) a plurality of times (for example, five times) to give the driver a striking feeling. The operation unit 205 may increase the tensile force of the seat belt 32 by transmitting a control signal to a motor for increasing the tensile force of the seat belt 32.

An example of a driving assistance method by the control device 2 will be described with reference to FIG. 3. The method of FIG. 3 may be started in response to the start of traveling of the vehicle 1. The control device 2 may continue to execute the method of FIG. 3 until the driving of the vehicle 1 ends.

In step S301, the environment recognition unit 201 recognizes the environment around the vehicle 1 as described above. In step S302, the vehicle body detection unit 202 determines whether or not a vehicle body is included in the environment around the vehicle 1. When it is determined that a vehicle body is included in the environment around the vehicle 1 ("YES" in step S302), the processing proceeds to step S303, and otherwise ("NO" in step S302), the process returns to step S301. In a case where a plurality of vehicle bodies are detected, the processing of step S303 and after is performed for each vehicle body.

In step S303, the operation determination unit 204 determines whether or not the detected vehicle body satisfies an operation condition regarding the vehicle body. When it is determined that the operation condition regarding the vehicle body is satisfied ("YES" in step S303), the processing proceeds to step S304, and otherwise ("NO" in step S303), the processing returns to step S301. The operation condition related to the vehicle body may be an existing condition. For example, it may be determined that the operation condition regarding the vehicle body is satisfied when the possibility that the vehicle 1 collides with the vehicle having the detected vehicle body is equal to or greater than a threshold value. In step S304, the operation unit 205 operates the safety device as described above. This operation may be for notifying the driver that there is a possibility that the vehicle 1 collides with the vehicle having the detected vehicle body, or for reducing the impact on the occupant of the vehicle 1 at the time of collision.

An example of the driving assistance method by the control device 2 will be described with reference to FIG. 4. The method of FIG. 4 may be started in response to the start of traveling of the vehicle 1. The control device 2 may continue to execute the method of FIG. 4 until the driving of the vehicle 1 ends. The control device 2 may execute the method of FIG. 3 and the method of FIG. 4 in parallel.

In step S401, the environment recognition unit 201 recognizes the environment around the vehicle 1 as described above. When the method of FIG. 3 and the method of FIG. 4 are performed in parallel, step S301 of FIG. 3 and step S401 of FIG. 4 may be integrated.

In step S402, the vehicle body detection unit 202 determines whether or not a travel wheel is included in the environment around the vehicle 1. When it is determined that a travel wheel is included in the environment around the vehicle 1 ("YES" in step S402), the processing proceeds to step S403, and otherwise ("NO" in step S402), the process returns to step S401. The appearance of the side surface of the vehicle greatly varies depending on the type of the vehicle. In contrast, the appearance of the wheels of the vehicle has a smaller variation depending on the type of vehicle than the appearance of the side surface of the vehicle. Therefore, when the side surface of the vehicle near the vehicle 1 faces the vehicle 1, even if the vehicle body detection unit 202 cannot detect the vehicle body of the nearby vehicle, the travel wheel detection unit 203 may be able to detect a wheel of this vehicle. Therefore, in some embodiments, the presence of another vehicle around the vehicle 1 (for example, forward) can be accurately detected by detecting the wheel speed of the vehicle in addition to the detecting the vehicle body of the vehicle. When a plurality of travel wheels are detected, the processing of step S403 and after is performed for each travel wheel.

Figure 3:
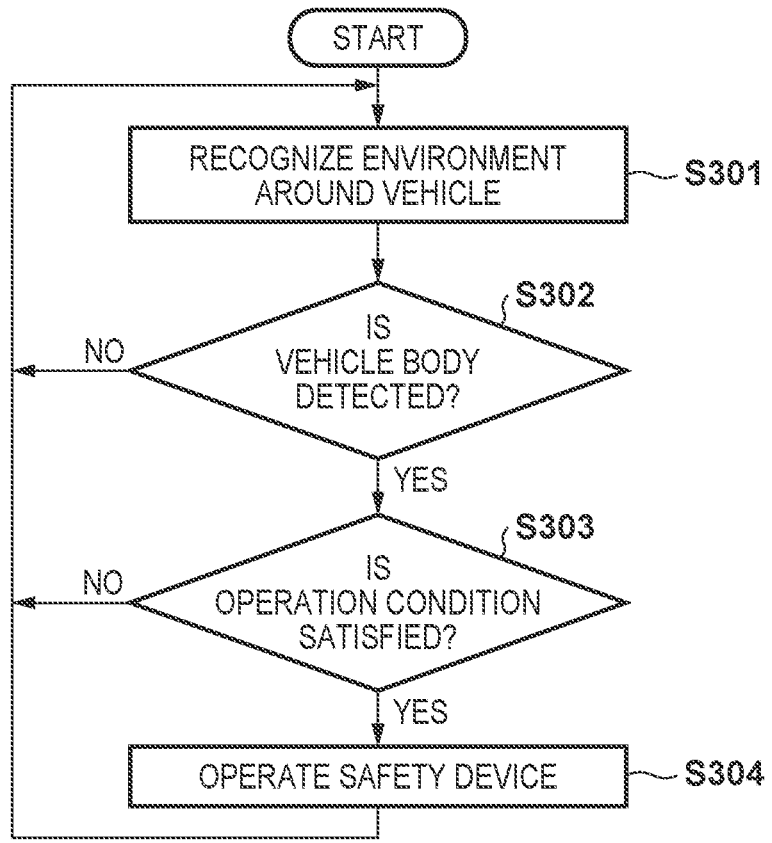
FIG. 3 is a diagram illustrating an operation example of the control device of the vehicle according to the embodiment of the present invention.

In step S403, the operation determination unit 204 determines whether or not the vehicle body having the travel wheel detected in step S402 is detected in step S302 of FIG. 3. When such a vehicle body is detected ("YES" in step S403), the processing returns to step S401, and otherwise ("NO" in step S403), the processing proceeds to step S404. When the vehicle body having the travel wheel detected in step S402 is detected in step S302 of FIG. 3, whether or not the operation condition is satisfied in step S303 of FIG. 3 is determined. The determination based on the vehicle body may have higher accuracy than the determination based on the travel wheels. Therefore, in the embodiment illustrated in FIG. 4, when the vehicle body having the travel wheel detected in step S402 is detected in step S302 of FIG. 3, the control device 2 does not perform the processing of subsequent steps S404 and S405 on the travel wheel. As a result, the processing load of the control device 2 is reduced, and excessive operation of the safety device is suppressed.

In step S404, the travel wheel detection unit 203 determines whether or not the travel wheel detected in step S402 is a front wheel or a rear wheel. When it is determined that the detected travel wheel is a front wheel ("YES" in step S404), the processing returns to step S401, and otherwise ("NO" in step S404), the processing proceeds to step S404. When it is determined that the detected travel wheel is a rear wheel, and when it cannot be determined whether the detected travel wheel is a front wheel or a rear wheel, the processing proceeds to step S404. When the travel wheel detection unit 203 has detected a front wheel of another vehicle, there is a high possibility that the control device 2 can recognize the front of the vehicle having the front wheel. In such a case, it is considered that the presence of another vehicle can be determined with higher accuracy by determining the operation condition based on the vehicle body in step S303 of FIG. 3. Therefore, when it is determined that the travel wheel is a front wheel, the control device 2 does not perform the processing in subsequent steps S404 and S405 on this travel wheel. As a result, the processing load of the control device 2 is reduced, and excessive operation of the safety device is suppressed.

When only one travel wheel is detected, the travel wheel detection unit 203 does not have to be able to determine whether the travel wheel is a front wheel or a rear wheel. When a plurality of travel wheels are detected, the travel wheel detection unit 203 may specify travel wheels included in the same vehicle body among these travel wheels. For example, the travel wheel detection unit 203 may specify two travel wheels moving in substantially the same direction while maintaining a substantially constant interval as travel wheels included in the same vehicle body. Among the two travel wheels identified to be included in the same vehicle body in this manner, the travel wheel detection unit 203 may identify a travel wheel on the traveling direction side of these travel wheels as a front wheel and a travel wheel on the opposite side to the traveling direction as a rear wheel.

In step S405, the operation determination unit 204 determines whether or not the detected travel wheel satisfies an operation condition regarding the travel wheel. When it is determined that the operation condition regarding the travel wheel is satisfied ("YES" in step S405), the processing proceeds to step S406, and otherwise ("NO" in step S405), the processing returns to step S401. In step S406, the operation unit operates the safety device as described above. This operation may be for notifying the driver that there is a possibility that the vehicle 1 collides with the vehicle having the detected travel wheel, or for reducing the impact on the occupant of the vehicle 1 at the time of collision.

Figure 4:
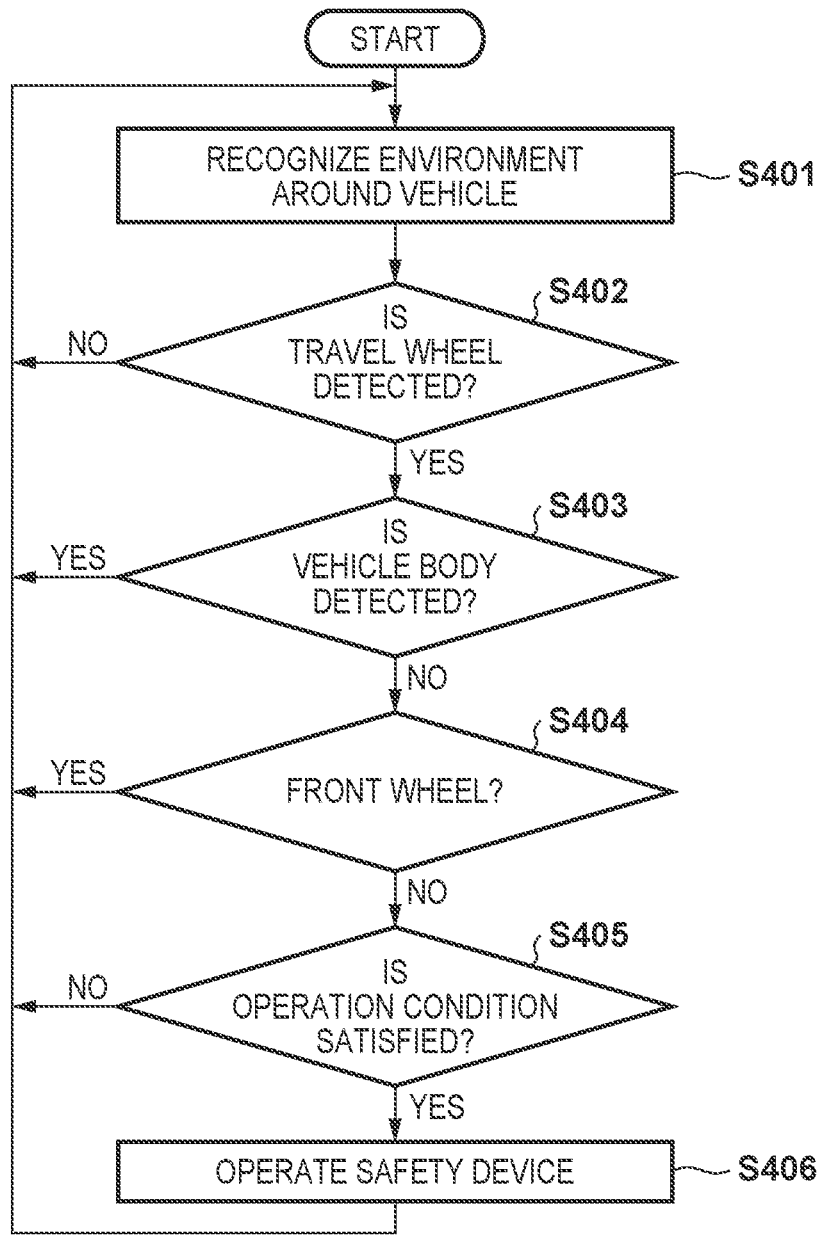
FIG. 4 is a diagram illustrating an operation example of the control device of the vehicle according to the embodiment of the present invention.
Figure 5:
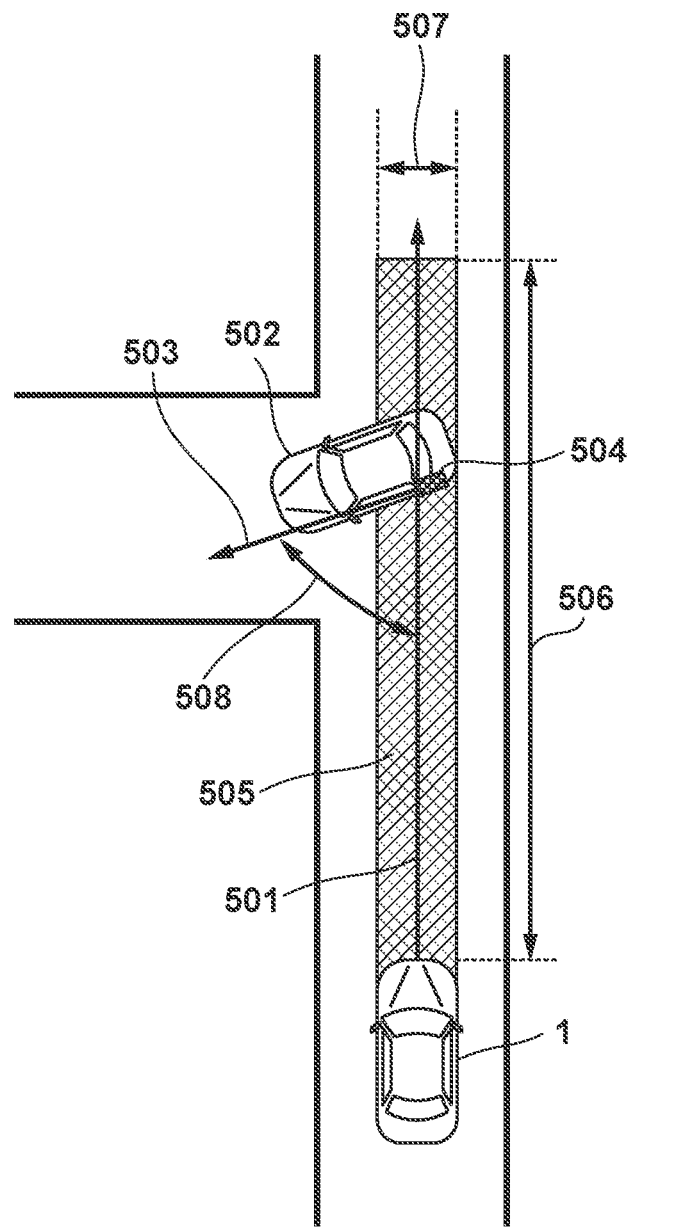
FIG. 5 is a diagram for describing an example of operation conditions according to the embodiment of the present invention.

With reference to FIG. 5, the operation condition regarding the travel wheel used in step S405 of FIG. 4 will be described. FIG. 5 illustrates an embodiment in a country in which it is prescribed by law that a vehicle travels on the left side of a road. However, the technology described in the present specification is also applicable to a country where it is prescribed by law that a vehicle travels on the right side of a road.

The operation condition (hereinafter, in the description of FIGS. 5 and 8A to 8C, simply referred to as an operation condition) regarding the travel wheel may include a condition regarding the position of the travel wheel. For example, the operation condition may include a condition that the detected travel wheel is located in front of the vehicle 1 and within the range of the vehicle width, and a distance between the detected travel wheel and the vehicle 1 is equal to or less than a threshold distance. Specifically, the operation condition may be a condition that the detected travel wheel is included in a region 505. The region 505 is located in front of the vehicle 1. A width 507 of the region 505 is equal to the vehicle width of the vehicle 1. A length 506 of the region 505 is equal to the threshold distance.

The threshold distance may be a value (for example, 50 meters) set in advance and stored in the memory 20b or the like. Alternatively, the threshold distance may be a value determined by the operation determination unit 204 based on the traveling state of the vehicle 1. For example, the operation determination unit 204 may determine the threshold distance based on the speed of the vehicle 1. For example, the threshold distance may be a distance by which the vehicle 1 is estimated to travel in the future in a predetermined time (for example, 3 seconds).

In the example of FIG. 5, it is assumed that a vehicle 502 is about to cross the front of the vehicle 1. In this situation, there is a high possibility that the vehicle 1 collides with the vehicle 502. In this situation, the travel wheel detection unit 203 detects a rear wheel 504 on the left side of the vehicle 502. Since the rear wheel 504 is a travel wheel (that is, a wheel of the traveling vehicle 502), the rear wheel 504 is located in front of the vehicle 1 and within the range of the vehicle width, and the distance between the rear wheel 504 and the vehicle 1 is equal to or less than the threshold distance (length 506 or less), the operation determination unit 204 determines that the operation condition is satisfied in step S405 of FIG. 4.

The operation condition may include a condition related to the traveling direction of the detected travel wheel. For example, the operation condition may further include a condition that an angle formed by the traveling direction of the detected travel wheel and the traveling direction 501 of the vehicle 1 is equal to or larger than a threshold angle. The angle formed by the two traveling directions may be an angle of 0 to 90 degrees of among the two angles formed by the two traveling directions. The traveling direction of the travel wheel may be considered to be equal to the traveling direction of the vehicle having the travel wheel.

In the example of FIG. 5, it is assumed that the rear wheel 504 is traveling in a traveling direction 503. In this case, the angle formed by the traveling direction 503 of the rear wheel 504 and the traveling direction 501 of the vehicle 1 is an angle 508. The operation condition may determine that the operation condition is satisfied when the angle 508 is greater than or equal to a threshold angle. The threshold angle may be determined in advance and stored in the memory 20b. The angle 508 may be, for example, 45 degrees. The larger the angle 508 is, the more difficult it becomes for the vehicle body detection unit 202 to detect the vehicle body of the vehicle 502. Therefore, as a result of the operation condition including a condition related to the traveling direction of the detected travel wheel, excessive operation of the safety device is suppressed.

The operation condition may be a condition that one or both of a condition related to the position of the travel wheel (for example, being included in the region 505) and a condition related to the traveling direction of the travel wheel (for example, the angle 508 being greater than or equal to the threshold angle) are satisfied.

The traveling direction 503 of the rear wheel 504 may be determined based on a change in the position of the rear wheel 504 over time. Alternatively, the traveling direction 503 of the rear wheel 504 may be determined based on the flatness of the wheel of the rear wheel 504. As the angle formed by the traveling direction of the travel wheel and the traveling direction 501 of the vehicle 1 is smaller, the flatness of the wheel of the travel wheel recognized by the environment recognition unit 201 becomes larger.

Figure 6:
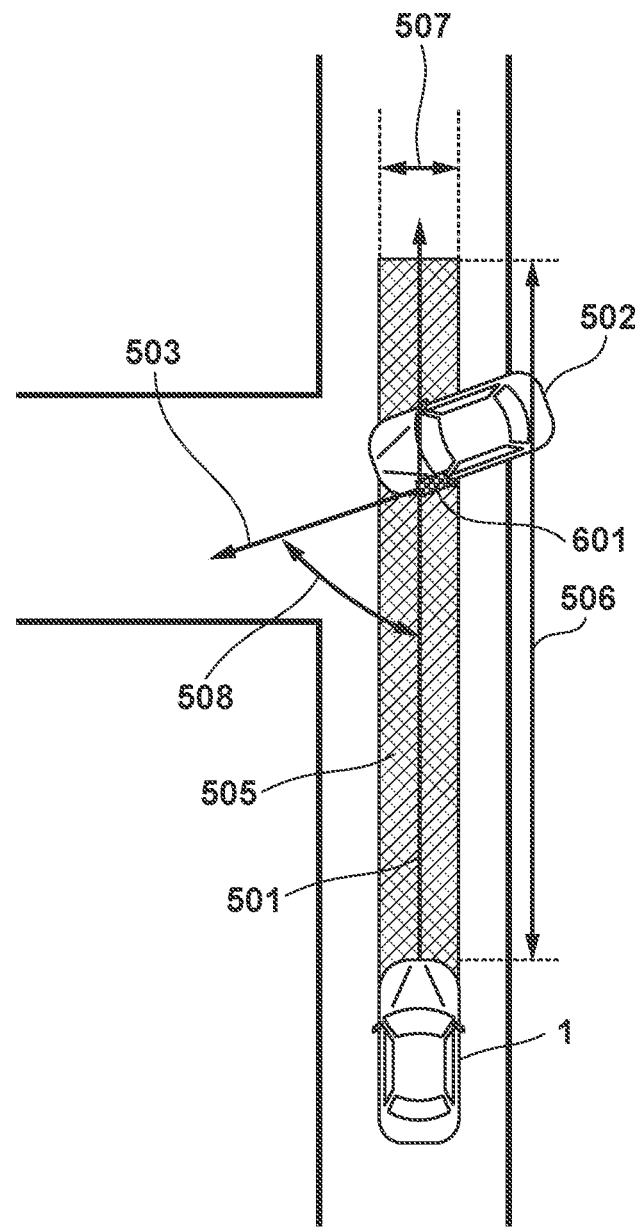
FIG. 6 is a diagram for describing an example of operation conditions according to the embodiment of the present invention.

Another example of the operation condition will be described with reference to FIG. 6. In the above-described embodiment, whether or not the detected travel wheel is a front wheel is determined in step S404 of FIG. 4. Step S404 may be omitted, and in this case, step S405 may be performed regardless of whether or not the detected travel wheel is a front wheel. Under this operation condition, as illustrated in FIG. 6, even when a front wheel 601 of the vehicle 502 is included in the region 505, the operation unit 205 operates the safety device. In FIG. 6, the traveling direction 503 represents the traveling direction of the front wheel 601.

Figure 7:
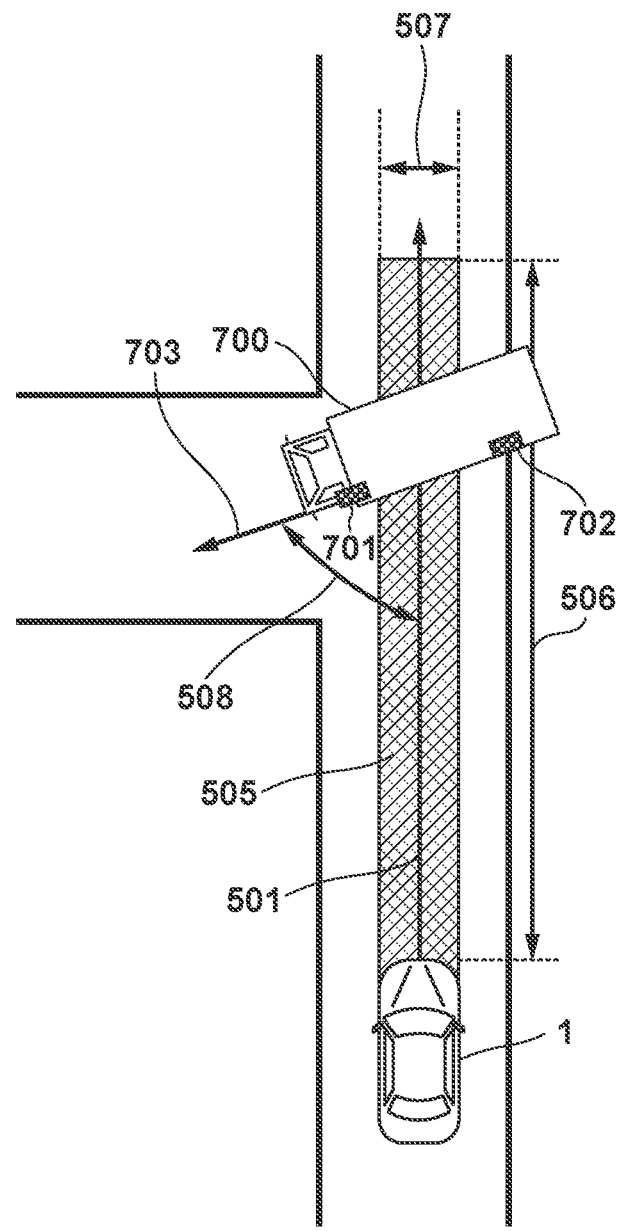
FIG. 7 is a diagram for describing an example of operation conditions according to the embodiment of the present invention.

Another example of the operation condition will be described with reference to FIG. 7. When the vehicle crossing in front of the vehicle 1 is a large vehicle such as a truck, the vehicle body can be included in the region 505 in front of the vehicle 1 even if no travel wheel is included in the region 505 in front of the vehicle 1. For example, as illustrated in FIG. 7, it is assumed that a vehicle 700 is about to cross in front of the vehicle 1. A front wheel 701 of the vehicle 700 is on the left side of the region 505 and a rear wheel 702 of the vehicle 700 is on the right side of the region 505. Thus, both the front wheel 701 and the rear wheel 702 are outside the region 505. However, the vehicle body of the vehicle 700 is included in the region 505. In this situation, there is a high possibility that the vehicle 1 collides with the vehicle 700.

In order to operate the safety device in such a situation, the operation condition may include a condition that two travel wheels are detected, the two travel wheels are travel wheels of the same vehicle body, and the range of the vehicle width of the vehicle 1 in front of the vehicle 1 is located between the two travel wheels. For example, it is assumed that the travel wheel detection unit 203 has detected two travel wheels (the front wheel 701 and the rear wheel 702) in step S402. At this point, it is not determined whether the two travel wheels are front wheels or rear wheels. Furthermore, it is assumed that the travel wheel detection unit 203 has specified that these two travel wheels are included in the same vehicle body as described above. In this case, in step S405, the operation determination unit 204 may determine whether or not the range of the vehicle width in front of the vehicle 1 is located between the two travel wheels. When it has been determined that the range of the vehicle width in front of the vehicle 1 is located between the two travel wheels, the operation unit 205 operates the safety device in step S406. In this operation condition, a condition relating to the traveling direction 703 of the travel wheels may or may not be imposed.

Figure 8A:
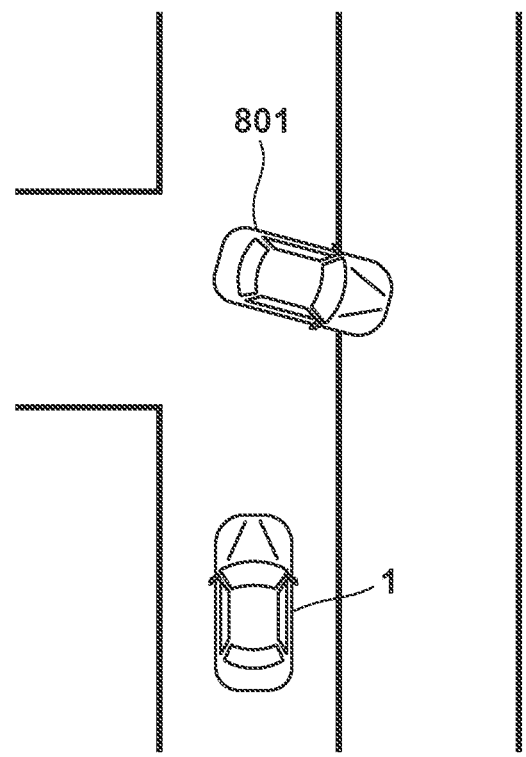
FIGS. 8A to 8C are diagrams for describing an example of a situation to which the embodiment of the present invention is applied.
Figure 8B:
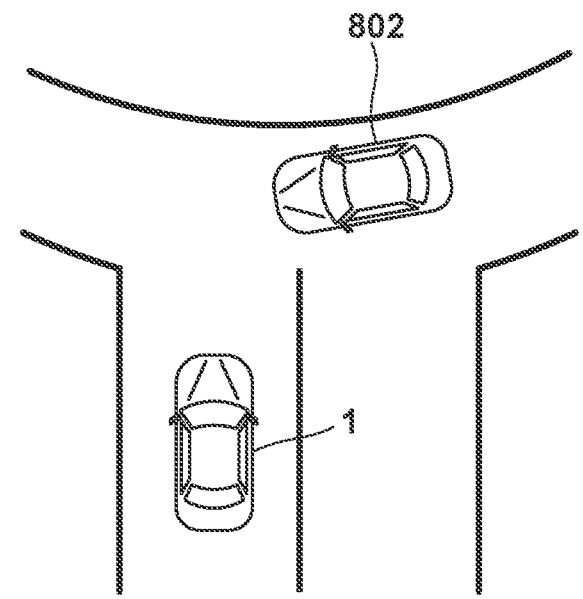
Figure 8C:
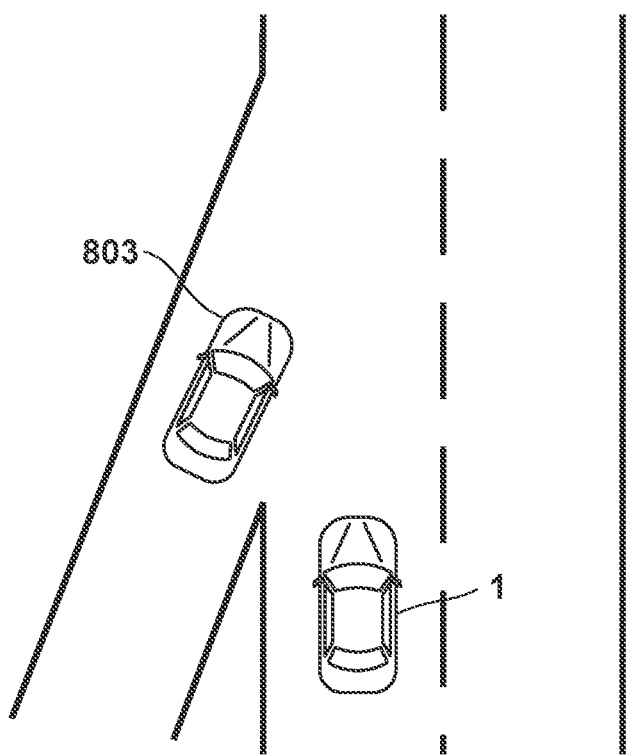

With reference to FIGS. 8A to 8C, a specific example of a situation where it is easy to determine that the operation condition is satisfied in step S405 of FIG. 4 described above will be described. As illustrated in FIG. 8A, it is assumed that a vehicle 801 crosses in front of the vehicle 1 when the vehicle 801 enters a road on which the vehicle 1 is traveling (for example, when leaving a garage or turning at an intersection). In this case, the control device 2 can detect a travel wheel of the vehicle 801, and can operate the safety device based on a result of this detection. As illustrated in FIG. 8B, it is assumed that a vehicle 802 is traveling in a roundabout and the vehicle 1 is about to enter the roundabout. In this case, the control device 2 can detect a travel wheel of the vehicle 802, and can operate the safety device based on a result of this detection. As illustrated in FIG. 8C, it is assumed that a lane in which a vehicle 803 is traveling merges with a lane in which vehicle 1 is traveling. In this case, the control device 2 can detect a travel wheel of the vehicle 803, and can operate the safety device based on a result of this detection.

In the above-described embodiment, it is determined whether the vehicle body having the detected travel wheel is detected in step S403 of FIG. 4. Step S403 may be omitted, and in this case, step S404 may be executed regardless of the detection situation of the vehicle body.

Summary of Embodiments

<Item 1> A driving assistance device (2) for assisting driving by a driver of a vehicle (1), the driving assistance device comprising:
a recognition unit (201) configured to recognize an environment around the vehicle;
a travel wheel detection unit (203) configured to detect a travel wheel (504) included in the environment around the vehicle;
an operation determination unit (204) configured to determine whether the travel wheel satisfies an operation condition of a safety device of the vehicle; and
an operation unit (205) configured to operate the safety device in a case where it is determined that the travel wheel satisfies the operation condition.

According to this item, it is possible to accurately detect the presence of another vehicle ahead.

<Item 2> The driving assistance device according to item 1, wherein the operation condition includes a condition that the travel wheel is located within a range (505) of a vehicle width in front of the vehicle and a distance between the travel wheel and the vehicle is equal to or less than a threshold distance (506).

According to this item, excessive operation of the safety device is suppressed.

<Item 3> The driving assistance device according to item 2, wherein the operation determination unit is configured to determine the threshold distance based on a speed of the vehicle.

According to this item, excessive operation of the safety device is suppressed.

<Item 4> The driving assistance device according to item 2 or 3, wherein the operation condition further includes a condition that an angle (508) formed by a traveling direction of the travel wheel and a traveling direction of the vehicle is equal to or greater than a threshold angle.

According to this item, excessive operation of the safety device is suppressed.

<Item 5> The driving assistance device according to any one of items 1-4, wherein
the travel wheel detection unit is configured to determine whether the travel wheel is a front wheel or a rear wheel,
in a case where it is determined that the travel wheel is a front wheel, the operation determination unit is configured not to determine whether the travel wheel satisfies the operation condition, and
in a case where it is determined that the travel wheel is a rear wheel, the operation determination unit is configured to determine whether the travel wheel satisfies the operation condition.

According to this item, excessive operation of the safety device is suppressed.

<Item 6> The driving assistance device according to any one of items 1-5, wherein the operation condition includes a condition that two travel wheels (701, 702) are detected, the two travel wheels are travel wheels of a single vehicle body (700), and a range of the vehicle width in front of the vehicle is located between the two travel wheels.

<Item 7> The driving assistance device according to any one of items 1-6, further comprising
a vehicle body detection unit (202) configured to detect a vehicle body included in the environment around the vehicle,
wherein, in a case where a vehicle body including the travel wheel detected by the travel wheel detection unit is detected by the vehicle body detection unit, the operation determination unit is configured not to determine whether the travel wheel satisfies the operation condition.

According to this item, excessive operation of the safety device is suppressed.

<Item 8> The driving assistance device according to any one of items 1-7, wherein operating the safety device includes increasing a tensile force of a seat belt (32) of the vehicle.

According to this item, it is possible to reduce the impact on the occupant of the vehicle at the time of collision.

<Item 9> A vehicle (1) including the driving assistance device according to any one of items 1-8.

According to this item, the above items are achievable in the form of a vehicle.

<Item 10> A non-transitory computer-readable storage medium storing a program that causes a computer to function as each unit of the driving assistance device (2) according to any one of items 1-8.

According to this item, the above-described items are achievable in the form of a program.

<Item 11> A method for assisting driving by a driver of a vehicle (1), the method comprising:
recognizing (S401) an environment around the vehicle;
detecting (S402) a travel wheel (504) included in the environment around the vehicle;
determining (S405) whether the travel wheel satisfies an operation condition of a safety device of the vehicle; and
operating (S406) the safety device in a case where it is determined that the travel wheel satisfies the operation condition.

According to this item, it is possible to accurately detect the presence of another vehicle ahead.

The invention is not limited to the foregoing embodiments, and various variations/changes are possible within the spirit of the invention.

What is claimed is:

1. A driving assistance device for assisting driving by a driver of a vehicle, the driving assistance device comprising at least one processor circuit with a memory comprising instructions that, when executed by the at least one processor circuit, cause the at least one processor circuit to at least:
recognize an environment around the vehicle;
detect a travel wheel included in the environment around the vehicle;
determine whether the travel wheel satisfies an operation condition of a safety device of the vehicle; and
operate the safety device in a case where it is determined that the travel wheel satisfies the operation condition,
wherein the operation condition includes a condition that the travel wheel is located within a range of a vehicle width in front of the vehicle and a distance between the travel wheel and the vehicle is equal to or less than a threshold distance.

2. The driving assistance device according to claim 1, wherein the instructions, when executed by the processor circuit, further cause the processor circuit to at least determine the threshold distance based on a speed of the vehicle.

3. The driving assistance device according to claim 1, wherein the operation condition further includes a condition that an angle formed by a traveling direction of the travel wheel and a traveling direction of the vehicle is equal to or greater than a threshold angle.

4. The driving assistance device according to claim 1, wherein the instructions, when executed by the processor circuit, further cause the processor circuit to at least:
determine whether the travel wheel is a front wheel or a rear wheel,
in a case where it is determined that the travel wheel is a front wheel, not to determine whether the travel wheel satisfies the operation condition, and
in a case where it is determined that the travel wheel is a rear wheel, determine whether the travel wheel satisfies the operation condition.

5. The driving assistance device according to claim 1, wherein the operation condition includes a condition that two travel wheels are detected, the two travel wheels are travel wheels of a single vehicle body, and a range of the vehicle width in front of the vehicle is located between the two travel wheels.

6. The driving assistance device according to claim 1, wherein the instructions, when executed by the processor circuit, further cause the processor circuit to at least:
detect a vehicle body included in the environment around the vehicle, and in a case where both of the travel wheel and a vehicle body including the travel wheel are detected, not to determine whether the travel wheel satisfies the operation condition.

7. The driving assistance device according to claim 1, wherein operating the safety device includes increasing a tensile force of a seat belt of the vehicle.

8. A vehicle including the driving assistance device according to claim 1.

9. A method for assisting driving by a driver of a vehicle, the method comprising:
   recognizing an environment around the vehicle;
   detecting a travel wheel included in the environment around the vehicle;
   determining whether the travel wheel satisfies an operation condition of a safety device of the vehicle; and
   operating the safety device in a case where it is determined that the travel wheel satisfies the operation condition,
   wherein the operation condition includes a condition that the travel wheel is located within a range of a vehicle width in front of the vehicle and a distance between the travel wheel and the vehicle is equal to or less than a threshold distance.

10. A non-transitory computer-readable storage medium storing a program that includes instructions that cause a computer to perform the method according to claim 9.

* * * * *